United States Patent [19]

Keyes

[11] Patent Number: 5,736,715
[45] Date of Patent: Apr. 7, 1998

[54] METHOD OF FORMING PRESSURE TESTABLE JOINT BETWEEN INSULATED PIPES USING SPLIT SLEEVE ARRANGEMENT

[75] Inventor: Thomas Joseph Keyes, Fort Worth, Tex.

[73] Assignee: Thermacor Process, Inc., Ft. Worth, Tex.

[21] Appl. No.: 618,128

[22] Filed: Mar. 19, 1996

[51] Int. Cl.$^6$ .................................................. H05B 3/58
[52] U.S. Cl. .................. 219/535; 156/64; 156/304.2; 285/47; 285/21; 219/544
[58] Field of Search .................. 219/494, 535, 219/507, 544, 524; 138/104, 155; 156/64, 158, 294, 304.2, 304.3, 304.6, 359, 360; 250/357.1, 368, 577; 285/47, 21, 292, 786

[56] References Cited

U.S. PATENT DOCUMENTS

| | | | |
|---|---|---|---|
| 2,742,390 | 4/1956 | Beck | 154/126 |
| 2,915,110 | 12/1959 | Ferguson et al. | 154/33.1 |
| 2,952,578 | 9/1960 | Carlson, Jr. | 154/126 |
| 2,983,306 | 5/1961 | Resnick | 154/42 |
| 3,047,703 | 7/1962 | Aske | 219/19 |
| 3,049,465 | 8/1962 | Wilkins | 156/272 |
| 3,061,503 | 10/1962 | Gould | 156/272 |
| 3,094,452 | 6/1963 | Von Riegen | 156/275 |
| 3,348,640 | 10/1967 | Thompson | 188/250 |
| 3,378,672 | 4/1968 | Blumenkranz | 219/200 |
| 3,465,126 | 9/1969 | Blumenkranz | 219/482 |
| 3,506,579 | 4/1970 | Blumenkranz | 156/275 |
| 3,685,546 | 8/1972 | Sigmund | 285/47 |
| 3,954,541 | 5/1976 | Landgraf | 156/275 |
| 4,176,274 | 11/1979 | Lippera | 219/522 |
| 4,234,781 | 11/1980 | Flink | 219/243 |
| 4,375,591 | 3/1983 | Sturn | 219/544 |
| 4,416,713 | 11/1983 | Brooks | 156/64 |
| 4,684,417 | 8/1987 | Grandclement | 156/64 |
| 4,851,647 | 7/1989 | Kühling | 219/535 |
| 4,952,262 | 8/1990 | Washkewicz | 156/149 |
| 5,313,034 | 5/1994 | Grimm et al. | 219/765 |
| 5,354,100 | 10/1994 | Wall et al. | 285/21 |
| 5,407,514 | 4/1995 | Butts et al. | 156/274.2 |
| 5,410,131 | 4/1995 | Brunet et al. | 219/535 |

FOREIGN PATENT DOCUMENTS

| | | |
|---|---|---|
| 1416207 | 9/1965 | France. |
| 2562613 | 4/1984 | France. |
| 3204681 | 2/1982 | Germany. |
| 085523 | 9/1970 | Japan. |
| 065594 | 5/1980 | Japan. |

*Primary Examiner*—Tu B. Hoang
*Attorney, Agent, or Firm*—Geoffrey A. Mantooth

[57] ABSTRACT

A joint is formed between two lengths of insulated pipes, which pipes have thermoplastic jackets. The jackets are joined together with a thermoplastic split sleeve. A welding rod arrangement is located along the edges on one side of the sleeve in a U-shaped configuration. The welding rod arrangement includes two side by side welding rods, each of which have a thermoplastic core with resistance wires embedded in the core. The split sleeve is wrapped around the joint with the sleeve overlapping the pipe jackets and also with the ends of the sleeve overlapping to form a longitudinal seam. The welding rod arrangement encircles each jacket in a partial spiral with a nonconductive core of thermoplastic located between the adjacent welding rod arrangements. In addition, the welding rod arrangement extends along the longitudinal seam. Electrical current is provided to the resistance wires, wherein the sleeve is welded to the pipe jackets and the split in the sleeve is welded closed.

8 Claims, 12 Drawing Sheets

METHOD OF FORMING PRESSURE TESTABLE JOINT BETWEEN INSULATED PIPES USING SPLIT SLEEVE ARRANGEMENT

FIELD OF THE INVENTION

The present invention relates to forming pressure testable joints between insulated pipes.

BACKGROUND OF THE INVENTION

There are many instances in which insulated pipelines are needed. For example, distributed HVAC (Heating, Ventilation, and Air Conditioning) applications utilize chilled water for cooling and steam for heating. The chiller and boiler are typically contained in a central location and the chilled water and steam are distributed to other locations. For example, on a school campus, the chiller and boiler may be located in a power plant building. The chilled water and steam are distributed to classrooms in separate buildings.

A set of insulated pipelines is used to convey the chilled water from the chiller to other locations and back to the chiller. Another set of insulated pipelines used to carry to the steam from the boiler to the other locations and back to the boiler. The insulated pipelines are usually located under ground.

Insulated pipe is conventional and commercially available. One type of insulated pipe uses a steel pipe to convey fluid. Around the outside of the steel pipe is a layer of insulating foam. Around the outside of the foam is a jacket of hard thermoplastic (such as High Density polyethylene (HDPE)). A plastic jacket protects the foam from mechanical damage and also provides a watertight seal to prevent corrosion of the steel pipe.

A problem that arises is how to join the individual pipes together in a pipeline. Specifically, the problem lies in how to join the jackets together to make an uninterrupted jacket around the pipeline. The joint between the jackets should be pressure testable so as to determine the integrity of the joint. Furthermore, provisions should be made for providing insulation around the steel pipe at the joint.

In the prior art, there are two techniques for joining plastic jackets together. One technique utilizes a heat shrink material. First, a split sleeve of the same material as the jacket is placed over the joint. Then, heat shrink material is wrapped around the sleeve and its edges. Heat is then applied. The heat shrink material does not create a weld, but instead relies on mastic properties. As a result, this type of joint will not hold a 5 psi pressure test, and therefore cannot be pressure tested.

The other technique utilizes a closed sleeve that is slid onto the pipe. Then, the steel pipes are welded together at the joint. Next, the sleeve is slid over the joint. Straps are wrapped around each end of the sleeve. The straps have electrical connections therein. Upon the application of electrical current, these straps shrink down so as to seal the ends of the sleeve to the jackets. While this technique produces a pressure testable joint, the tolerances between the inside diameter of the sleeve and the outside diameters of the jackets must be very close. As a result, frequently it is difficult to slide the sleeve into a position over the joint. Environmental conditions (heat and cold), as well as filling the joint with foam frequently render positioning the sleeve onto the joint impossible.

SUMMARY OF THE INVENTION

It is an object of the present invention to provide a method for joining insulated pipes together that is inexpensive in application.

It is a further object of the present invention to provide a method for joining insulated pipes together that is easy to use.

The method of the present invention joins together first and second thermoplastic jackets of insulated pipes. A split thermoplastic sleeve is provided. The sleeve has a first circumferential edge portion and second circumferential edge portion and also first and second end portions that extend between the first and second circumferential edge portions. A welding rod arrangement extends along the first circumferential edge portion, the second end portion and the second circumferential edge portion. The welding rod arrangement that is located along the first circumferential edge portion extends beyond the first end portion so as to form a first stub. Likewise, the welding rod arrangement that is located along the second circumferential edge portion extends beyond the first end portion so as to form a second stub. The welding rod arrangement includes two side by side welding rods, with each of the welding rods comprising a solid core of thermoplastic material. A plurality of wires is embedded in the core and located in close proximity to a surface of the core.

The split sleeve is wrapped around the first and second jackets such that the first circumferential edge portion is located around the first jacket, the second circumferential edge portion is located around the second jacket, and the first and second end portions are overlapping. The welding rod arrangement that extends along the first circumferential edge portion is interposed between the first circumferential edge portion and the first jacket. The welding rod arrangement that extends along the second circumferential edge portion is interposed between the second edge portion and the second jacket. The welding rod arrangement that extends along the first end portion is interposed between the first and second end portions of the sleeve. The first stub is adjacent to a portion of the welding rod arrangement that extends along the first circumferential edge portion and that is located near the second end portion. A nonconductive thermoplastic core is located between the first stub and the welding rod arrangement that extends along the first circumferential edge portion and that is located near the second end portion. The second stub is adjacent to a portion of the welding rod arrangement that extends along the second circumferential edge portion that is located near the second end portion. Another nonconductive thermoplastic core is located between the second stub and the welding rod arrangement that extends along the second circumferential edge portion and that is located near the second end portion.

Electrical current is provided to the wires in the welding rods thereby heating the cores of the welding rods and welding the first circumferential edge portion to the first jacket, the second circumferential edge portion to the second jacket and the first end portion to the second end portion.

With the method of the present invention, the split sleeve, in combination with the welding rod arrangement, allows a joint to be made between two jackets in an inexpensive and simple manner. The split sleeve and welding rod arrangement is simple to fabricate and in fact can be prefabricated before the pipe installation. The welding rods are welded to one surface of the split sleeve in a "U" shaped configuration. With the fabricated split sleeve, the sleeve is merely wrapped around the pipe jackets. There is no awkward fitting of a closed sleeve over pipe. Once the sleeve is wrapped around the jackets, electrical current is applied to the welding rods, wherein the sleeve is welded or fused around the jackets. In addition, the split in the sleeve is welded or fused closed. The double welding rods, together with the nonconductive core between different segments of the welding rods, insure a high strength seal through all the joints of the sleeve.

BRIEF DESCRIPTION OF THE DRAWINGS

FIG. 6 shows abrading the edges of the jackets.

FIG. 7 shows the split sleeve of FIG. 3 wrapped around the joint.

FIG. 8 shows the split sleeve being held in place prior to welding by bands.

FIG. 9 shows the connection of electrical cables to the ends of the sleeve welding rod.

FIG. 10 shows pressure testing the jacket joint formed by the sleeve.

FIG. 11 shows pouring insulating foam into the sleeve cavity.

FIG. 12 shows a patch that is to be applied over the holes in the sleeve.

FIG. 13 shows securing the patch in places and connecting electrical cables to the ends of the patch welding rod.

DESCRIPTION OF THE PREFERRED EMBODIMENT

Figure 1:
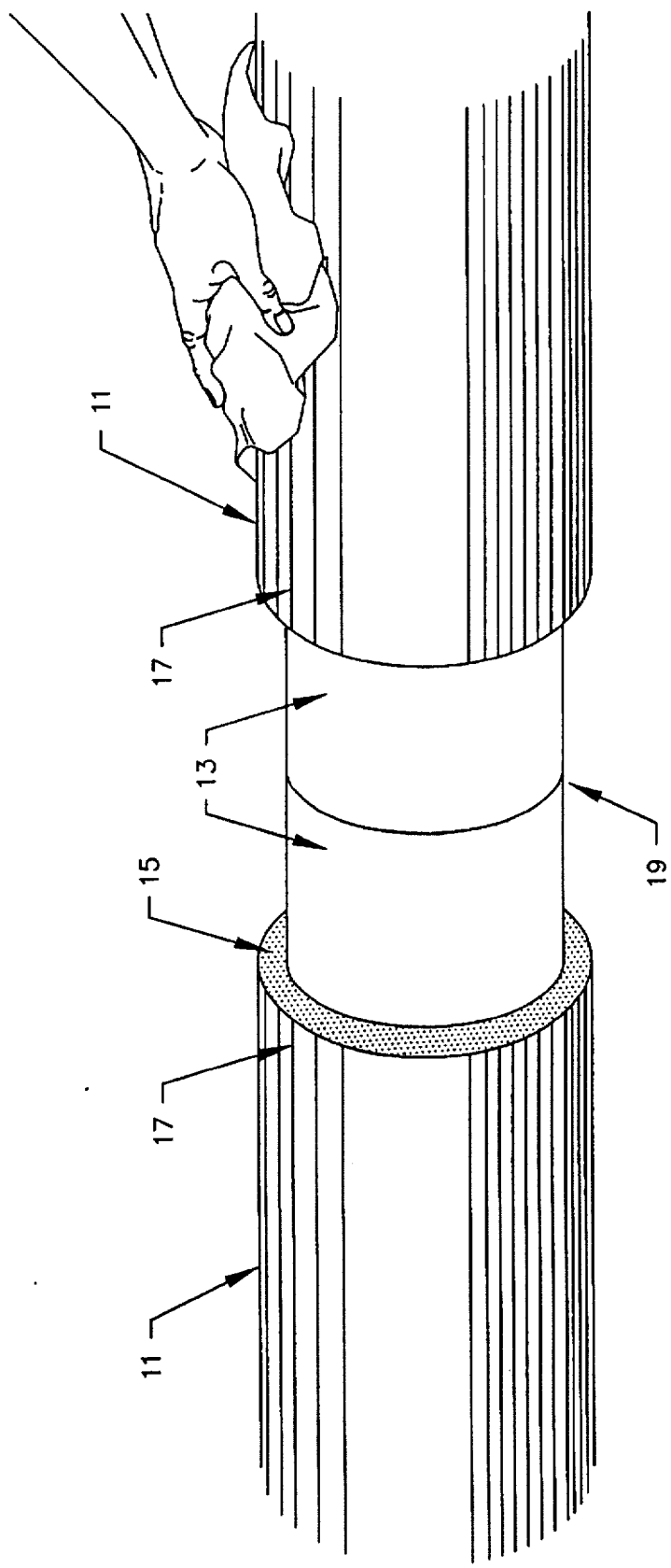
FIG. 1 is a side view of the ends of two insulated steel pipes butted together.

The present invention is used to form a joint between two lengths of insulated pipes. Referring to FIG. 1, there is shown two lengths of pipe 11 butted together. Each length of pipe 11 has an internal steel pipe 13, which is surrounded by a layer of insulating foam 15. Around the foam 15 is a thermoplastic jacket 17. In the preferred embodiment, the jacket is a HDPE, which provides a hard shell around the insulating foam 15 and the steel pipe 13.

The pipe 11 is conventional and commercially available. In order to assist joining lengths of pipe together, the ends of the steel pipe 13 extend a short distance beyond the foam 15 and the jacket 17. Thus, the end portions of the steel pipe 13 are exposed. When two steel pipes 13 are butted together as shown in FIG. 1, there is a gap 19 between the jackets 17.

Figure 2:
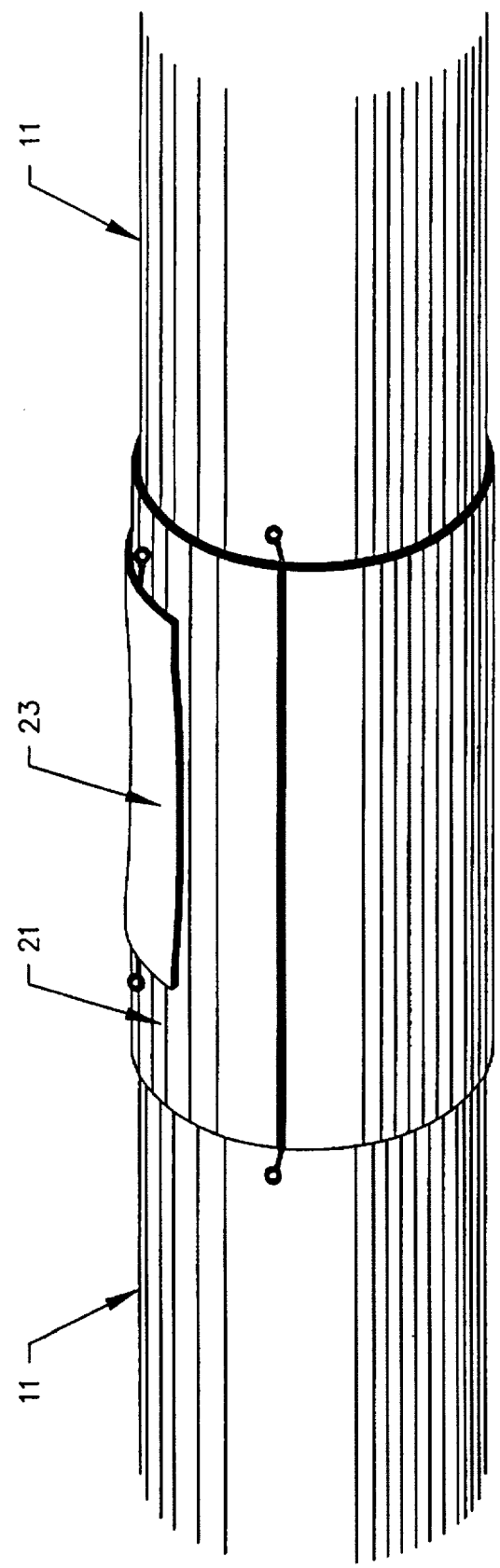
FIG. 2 is a side view of a finished joint of the two pipes of FIG. 1 using the split sleeve arrangement of the present invention.

The present invention provides a split sleeve 21 that seals the gap 19 (shown in FIG. 1), as shown in FIG. 2. The split sleeve is easily applied to the joint between the pipes 11. First, the split sleeve is wrapped over the gap 19. Then, the split sleeve 21 is welded closed around the pipe jackets 17 so as to provide an airtight seal. In addition to being welded to the jackets, the seam formed by the split of the sleeve 21 is welded closed. After the sleeve has been welded a hole is formed in the sleeve so that the jacket joint can be pressured tested. Then, foam is added to the gap between the two pipes through the hole. Then, a patch 23 of thermoplastic material is welded over the hole to seal the joint. By using a split sleeve 21 at each joint between pipe lengths, a pipeline having a continuous jacket and insulating foam can be fabricated from plural lengths of insulated pipe.

Figure 3:
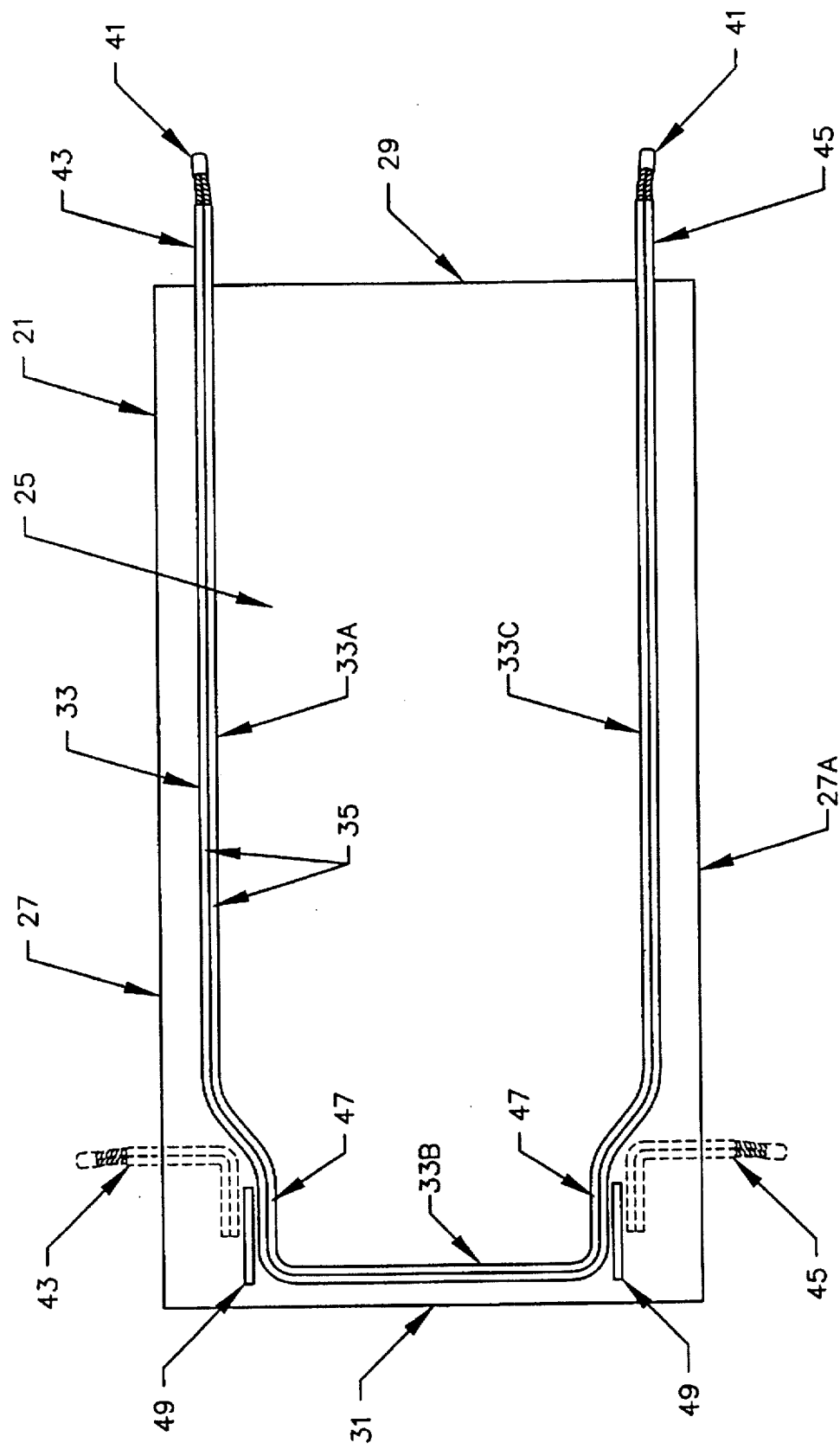
FIG. 3 is a plan view of one side of the split sleeve of the present invention, in accordance with a preferred embodiment.

Referring to FIG. 3, the split sleeve 21 will be described in more detailed. The split sleeve 21 includes a sheet 25 and a welding rod arrangement 33. The sheet 25 is made of thermoplastic, such as HDPE. The thickness of the sheet 25 should be close to the thickness oft he pipe jacket 17. However, if the thickness makes the sleeve too stiff to satisfactorily wrap around the pipe jackets 17, then the thickness can be reduced. The sheet 25 is cut in the shape of a rectangle. The sheet 25 has two circumferential edges 27, 27A, an inside edge 29, and an overlapping, or outside, edge 31.

The welding rod arrangement 33 is provided on one side of the sheet 25. The other side of the sheet has no welding rod arrangement. The welding rod arrangement 33 is made up of two lengths of welding rod 35 in a side by side configuration. The welding rod 35, which is conventional and commercially available is described, it is described in U.S. Pat. No. 5,407,514 the disclosure of which is incorporated herein by reference.

Figure 4:
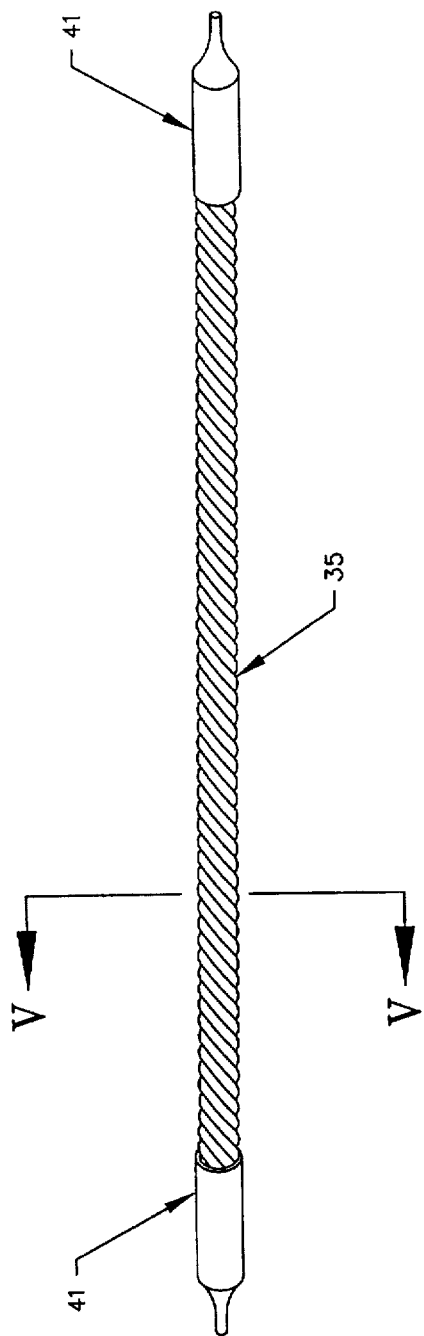
FIG. 4 is a view of a length of a welding rod that is provided on the split sleeve of FIG. 3.
Figure 5:
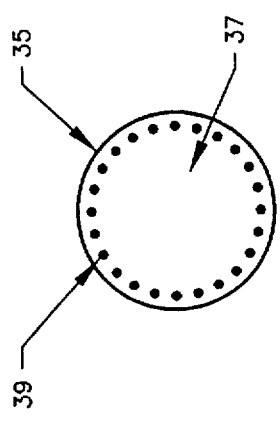
FIG. 5 is a cross-sectional view of the welding rod of FIG. 4, taken through lines V—V.

For convenience, the welding rod 35 is shown in FIGS. 4 and 5. The welding rod 35 is formed of a solid core 37 of a thermoplastic material (such as HDPE). There is also a resistance element 39 in the form of plural wires provided in a spiral or helical arrangement. The wires 39 can be made of stainless steel. The wires 39 extend the length of the rod 35 and are embedded in the core 37 just beneath the outside surface 40 of the core 37. The ends of the welding rod 35 have conductive tips 41 thereon, which lips are electrically connected to the wires 39.

In use, the welding rod 35 is placed between two pieces of thermoplastic. Electrical current is passed through the wires 39. The wires generate heat and heat the core 37. As the core is heated, the two pieces of thermoplastic are welded together by the welding rod.

Referring back to FIG. 3, the layout of the welding rod arrangement 33 on the sheet 25 will be described. The welding rod arrangement 33 has a first circumferential edge portion 33A that extends near the first circumferential edge 27, an overlapping edge portion 33B that extends near the overlapping edge 31, and a second circumferential edge portion 33C that extends near the second circumferential edge 27A. Thus, referring to the orientation of FIG. 2, the welding rod arrangement 33 in general forms a "U" shaped configuration. The welding rod arrangement 33 is offset from the edges 27, 27A, 31 of the sheet 25 by a distance. In the preferred embodiment, this distance is about one inch.

The end portions of the welding rod arrangement 33 form stubs 43, 45 that extend from the inside edge 29. Each stub 43, 45 has a conductive tip 41 thereon. The resistance wires 39 located inside of each welding rod form an electrical circuit between the two tips 41. There is no need for the welding rod to traverse along the inside end, because this inside edge 29 of the sheet 25 is adjacent to the gap 19 (and not to any plastic).

The welding rod arrangement 33 has offset portions 47. These offset portions are located between the first and second circumferential edges 33A, 33C and the overlapping edge 33B. The offset portions 47 are indented inwardly (away from the circumferential edges 27, 27A) somewhat. There is provided on the sheet 25, at each of these offset locations, an inert spacer 49. Each spacer 49 is formed of thermoplastic material and can be a rod having the same diameter as a welding rod 35. The spacers are nonconductive.

The ribs are coupled to the sheet 25 by conventional welding. Likewise, the welding rod arrangement 33 is coupled to the sheet 25 by welding. In the preferred embodiment, the sleeve 21 is prefabricated before the installation of the pipe occurs.

Now the method of the present invention will be described. Referring to FIG. 1, the ends of the inside steel pipes 13 are butted together. The steel pipes 13 are welded together all around their circumferences. As can be seen in FIG. 1, there is a gap 19 between the two jackets 17 and the foam 15. This gap 19 allows the steel pipes to be welded together. The joint between the steel pipes 13 can be pressure tested.

After the steel pipes 13 have been welded together, the joint between the two jackets 17 can be fabricated. First, the two jackets 17 are cleaned. This can be done, for example, by using a plastic cleaner such as isopropyl alcohol. In addition, the sleeve 21 is cleaned with a plastic cleaner. In particular, those surfaces of the jackets 17 and the sleeve 21 that are likely to be in contact with plastic are cleaned. The jackets and sleeve are allowed to dry.

Figure 6:
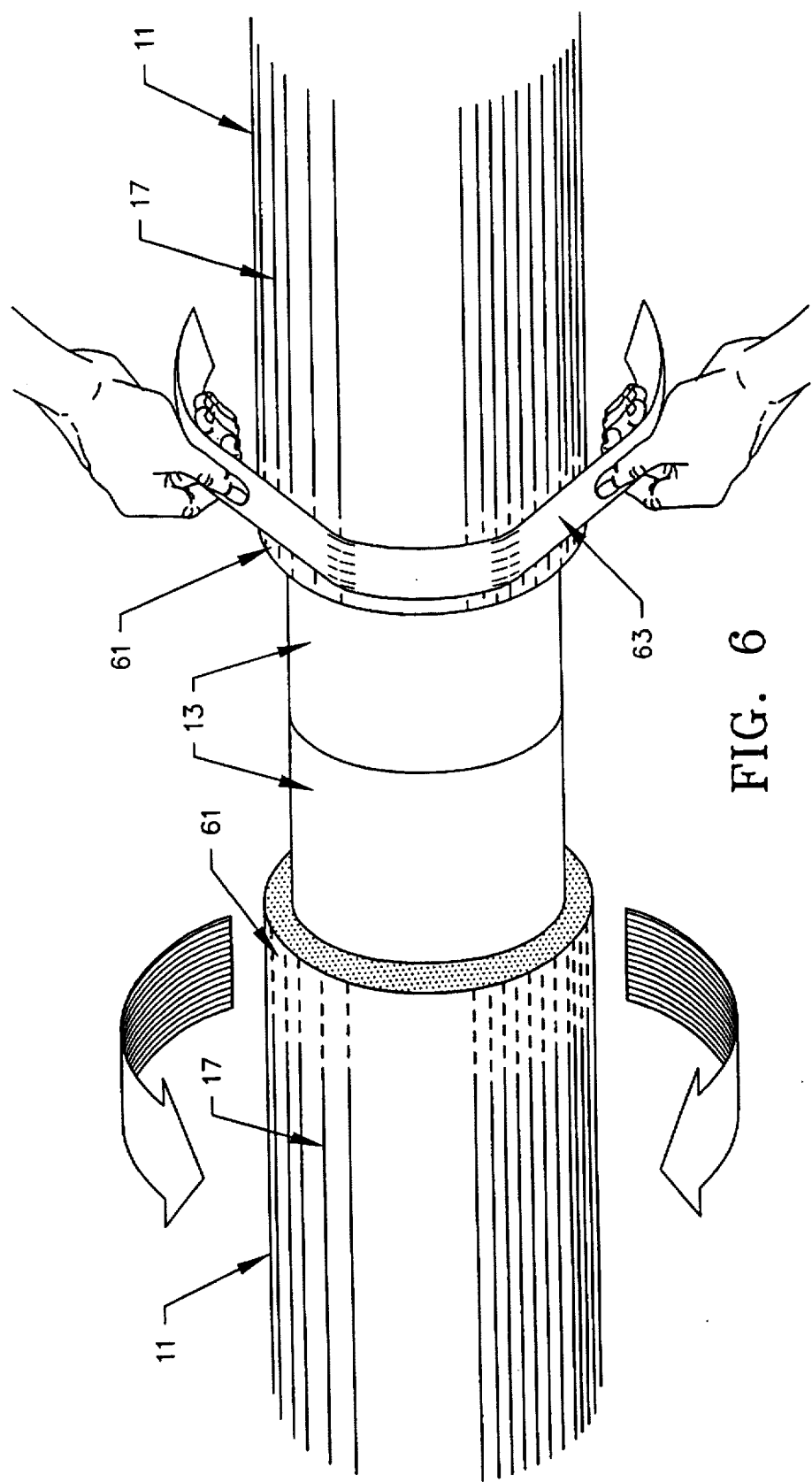
FIG. 6–13 are views illustrating the steps of the method the present invention, in accordance with a preferred embodiment.

Next, referring to FIG. 6, the edges 61 of the jackets 17 that are to be fused or welded to the sleeve 21 are abraded. An abrasive tape 63 can be used, as shown in FIG. 6. The tape 63, which is conventional and commercially available, is moved back and forth across a portion of the circumference of the jacket edge 61. The entire circumference of each jacket edge 61 is abraded in a similar manner. An area of a few inches wide from the jacket edge is abraded. The dust produced by the abrasion is removed from the jacket by a rag dampened with alcohol. Then, the jackets 17 are allowed to dry.

Figure 7:
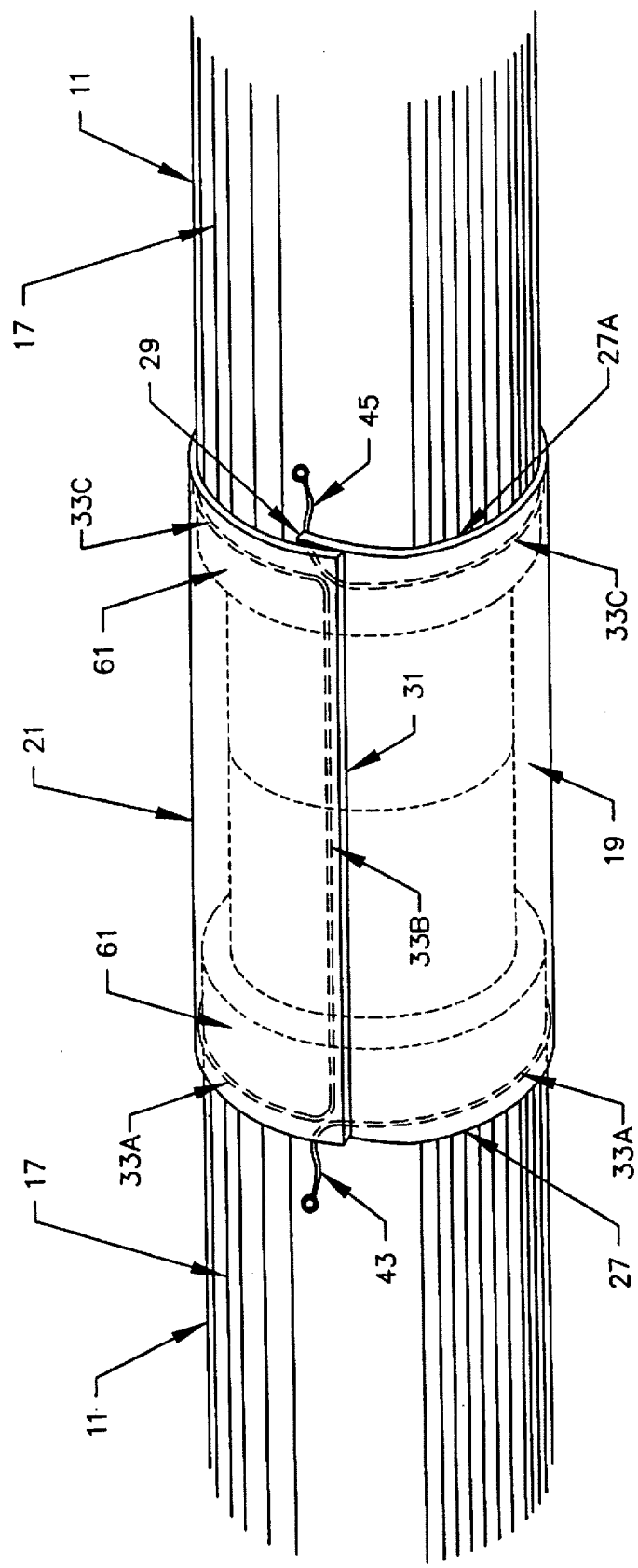

Next, the split sleeve 21 is wrapped around the gap 19, as shown in FIG. 7. Specifically, the circumferential edges 27, 27A of the split sleeve 21 overlap the abraded jacket edges 61 for several inches. The outer edge 31 overlaps the inner edge 29. The longitudinal seam formed by the outer edge overlapping the inner edge is located about 60 degrees from the top of the pipe. This orientation of the seam of the split sleeve provides a seamless top portion for pressure testing and foam filling operations, yet locates the stubs 43, 45 in a convenient position near the top of the pipe.

When the sleeve 21 is wrapped around the pipes 11, the welding rod arrangement segment 33A that is located near the first circumferential edge 27 is interposed between one of the jackets 17 and first circumferential edge portion of the sleeve 21, the welding rod arrangement segment 33C that is located near the second circumferential edge 27A is interposed between the other of the jackets 17 and the second circumferential edge portion of the sleeve 21, and the welding rod arrangement 33B that is located near the overlapping edge 31 is interposed between the overlapping edge portion of the sleeve and the inside edge portion 29 (in FIG. 7, the welding rod arrangement segments are shown by dashed lines).

The two stubs 43, 45 are located adjacent to the spacers 49, such that the respective spacer 49 is interposed between the respective stub and the respective offset portion 47 (see FIG. 3). For example, the first stub 43 is located is adjacent to the segment 33A so as to effectively seal all around the jacket 17, with the spacer 49 maintaining electrical isolation between the stub 43 and the offset portion 47 of the welding rod arrangement. The welding rod arrangement thus forms a partial spiral around each pipe jacket 17. The ends of the stubs 43, 45 extend out from the sleeve along the pipes. The tips 41 are exposed.

Figure 8:
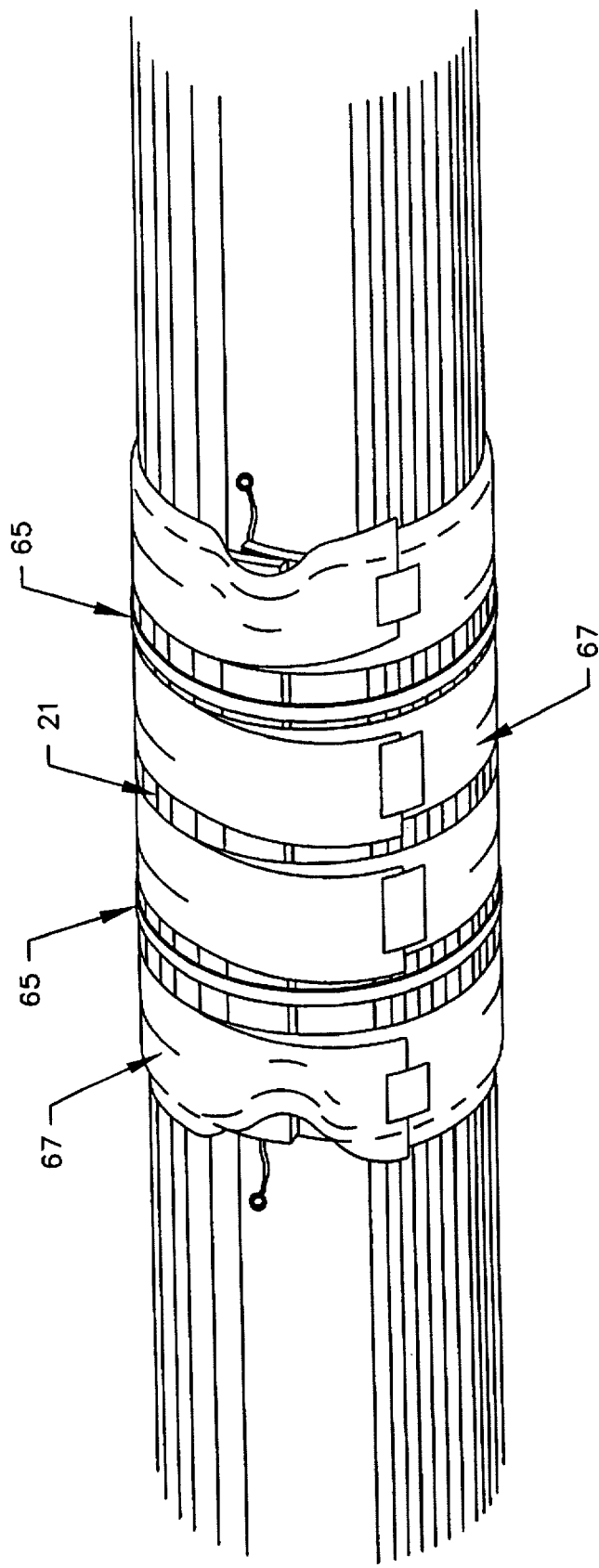

Next, referring to FIG. 8, the split sleeve is secured in place on the two pipes by mechanical means. Metal bands 65 are located around the circumference of the split sleeve 21 and are tightened. Even pressure should be maintained uniformly on those surfaces that are to be welded or fused together. No gaps between these fusion surfaces should be visible. Rubber bands 67 are stretched around the circumference of the sleeve 21 at the edges of the sleeve and in the middle of the sleeve. The rubber bands are secured by tape.

Figure 9:
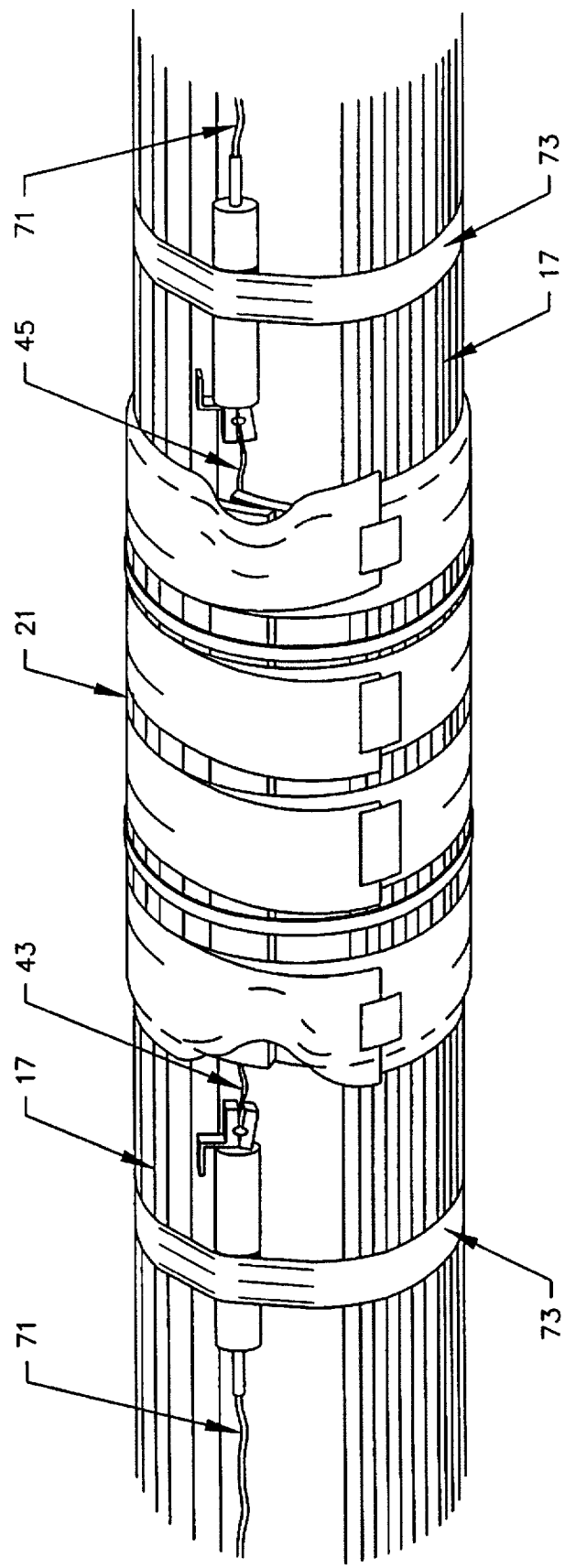

Then, electrical cables 71 are connected to the tips 41 (see FIG. 9). The electrical cables are secured to the jacket 17 by tape 73. The cables 71 are connected to a power source, such as a 110V single phase welding machine.

Electrical current is applied to the welding rods through the cables 71. The resistance wires 39 (FIG. 5) in the welding rods form a circuit between the tips 41. Specifically, the circuit path (which can be seen more clearly in FIG. 7) is through one stub 43, through the segment 33A that is adjacent to the first circumferential edge 27, wherein the segment 33A encircles the circumference of one jacket 17, through the segment 33B that extends in the seam between the overlapping and inside edges 31, 29 of the sleeve, through the segment 33C that is adjacent to the second circumferential edge 27A, wherein the segment 33C encircles the circumference of the other jacket, and through the other stub 45. As an example of the magnitude and duration of current, a 12 amp current is applied to the welding rods for about 15–20 minutes.

The current is then turned off, and the cables 71 are disconnected from the stubs 43, 45. The stubs are tucked under the sleeve before the stubs cool. This assists in completing the seal between the sleeve 21 and the jackets 17. A putty knife can be used to push the stubs in under the sleeve. The tips of the stubs are lea exposed. The sleeve and welding rods are allowed to cool for a few minutes before proceeding.

Figure 10:
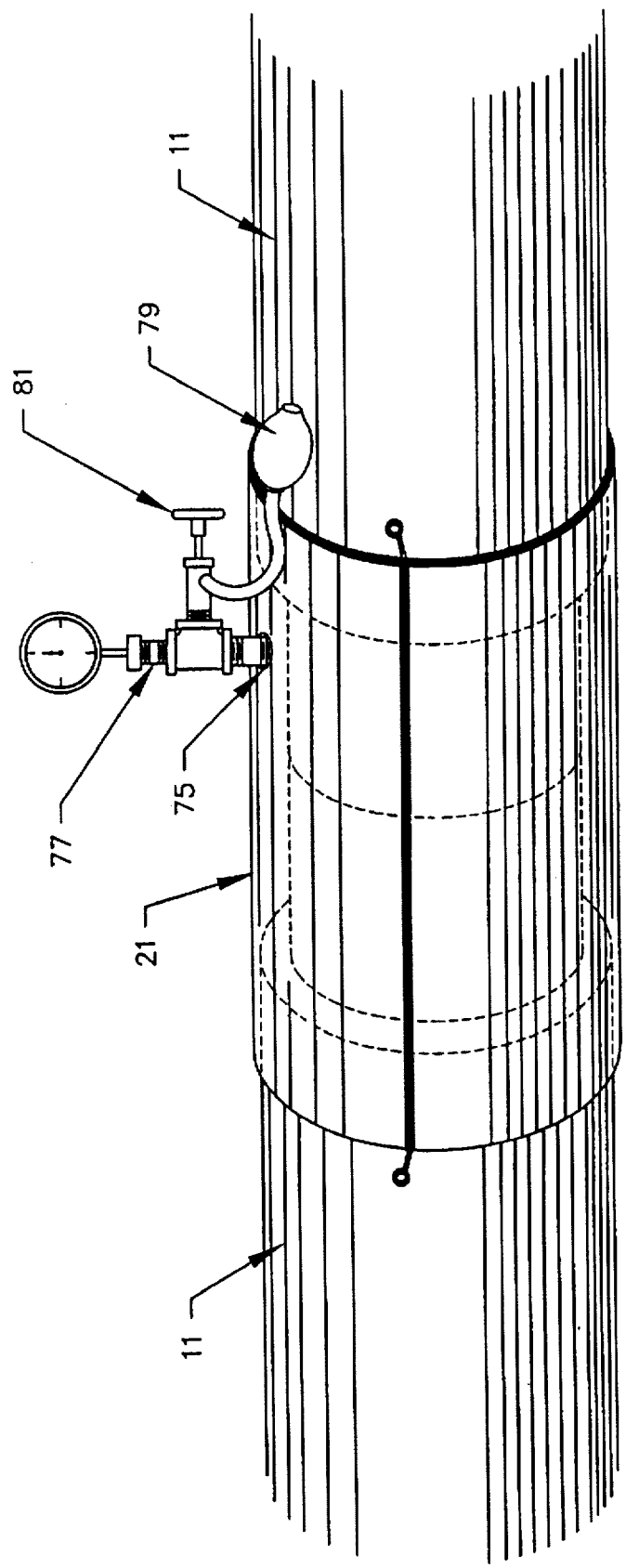

Once the sleeve 21 has been welded to the jackets, the bands are removed, and the seal along the joints can be pressured tested. Referring to FIG. 10, a hole 75 is drilled in the top portion of the sleeve 21. The hole is located about an inch from the edge of the foam insulation of one of the pipes 11. A pressure gauge and valve test device 77 are pushed into the hole. A hand pump 79 is used to pressurize the cavity inside of the sleeve to 5 psig.

After the pressurizing the cavity, the valve 81 to the hand pump is closed to prevent leakage through the pump. Large leaks can be detected by listening pinhole leaks are detected soaping the joints. Any leaks that are found are plugged.

Figure 11:
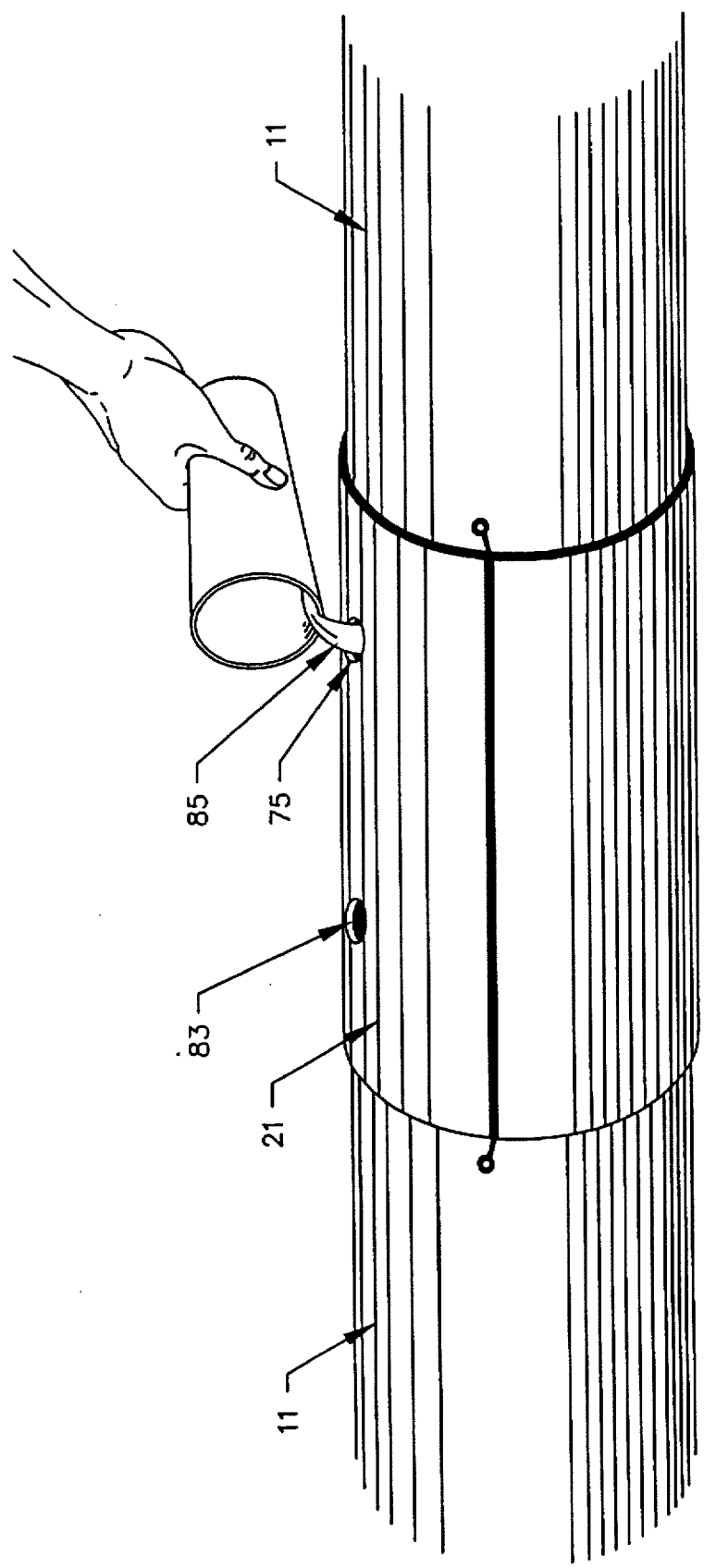

After pressure testing the sleeve 21, the cavity inside of the sleeve is filled with foam to provide insulation around the steel pipe. The pressure test device 77 is removed from the hole 75. Referring to FIG. 11, a second hole 83 is drilled into the top portion of the sleeve 21. This hole is within an inch of the foam insulation on the opposite pipe, so as to space apart the two holes. Then, the foam ingredients 85 are mixed and poured into one of the holes. The foam is a conventional and commercially available material. Foam and gas are allowed to escape through the holes. When the foam comes out of both holes 75, 83, the cavity is full. The foam is allowed to cure and solidify.

Figure 12:
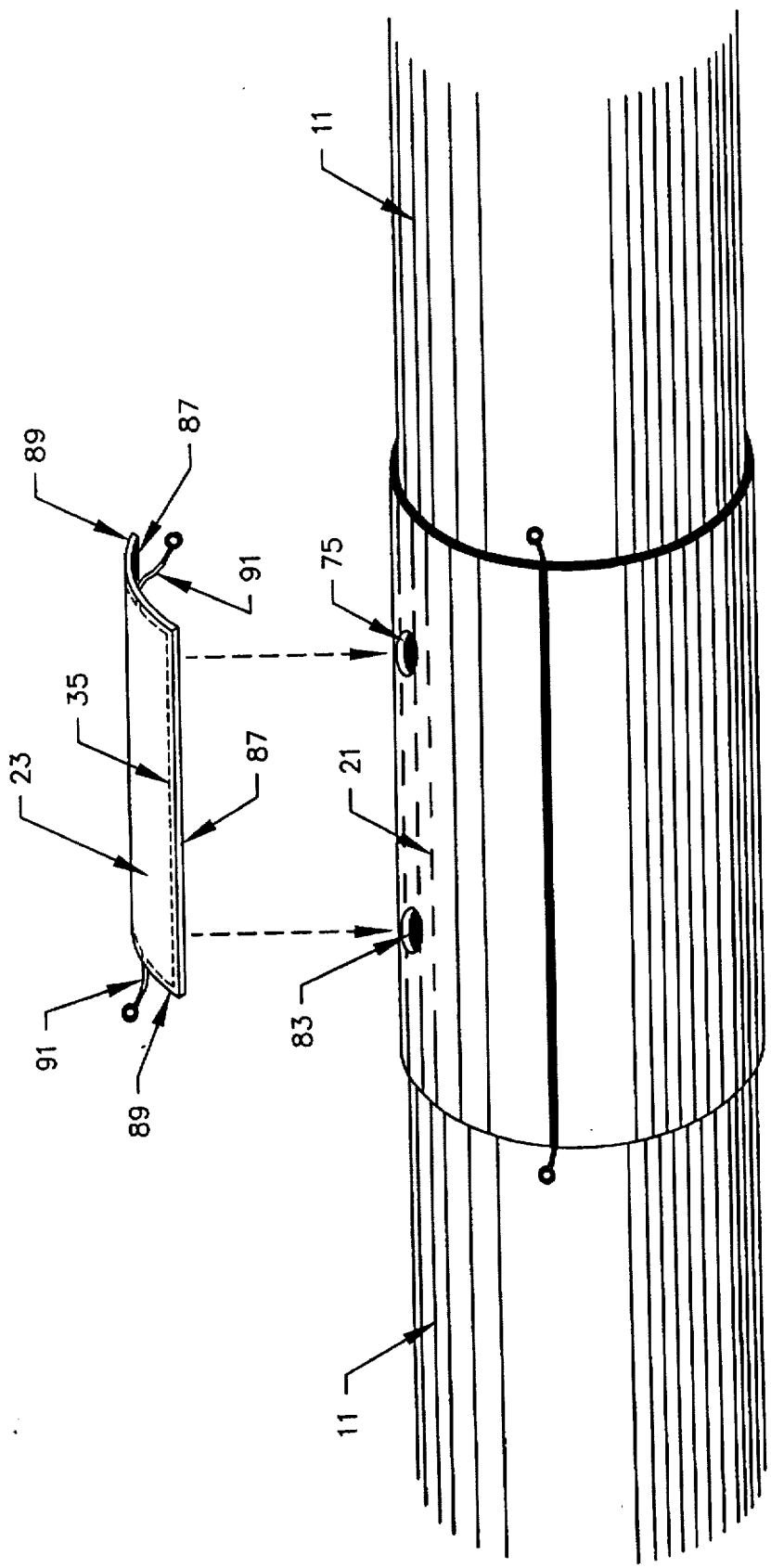

A patch 23 is put on the sleeve 21 in order to seal the two holes 75, 83. Referring to FIG. 12, the patch 23 is a sheet of thermoplastic. The patch has two sides 87 and two ends 89. The under side of the patch contains welding rods 35 along the patch sides 87 and ends 89. Stubs 91 of the welding rod extend out from the patch ends.

Any excess foam is cleaned off of the sleeve 21. The top area of the sleeve is abraded and then cleaned with alcohol. Then, the patch 23 is located over the two holes such that the welding rod 35 is interposed between the patch and sleeve 21.

Figure 13:
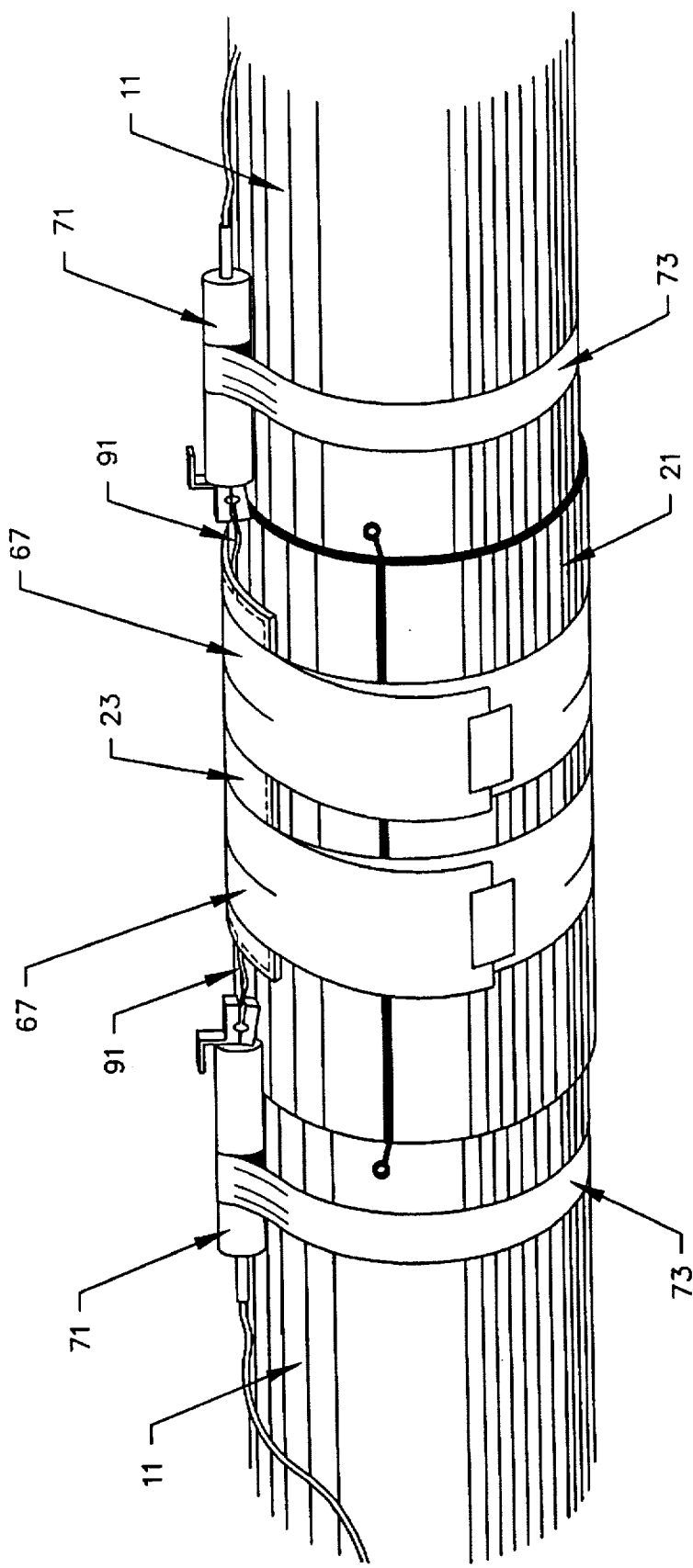

Referring to FIG. 13, the patch 23 is secured in place with rubber bands 67. The cables 71 are connected to tips on the ends of the stubs 91. Electrical current is applied to the welding rod for a time suitable to weld or fuse the patch 23 to the sleeve 21.

After allowing the patch to cool, the patch 23 is visually inspected to determine if the joint has been satisfactorily sealed.

The completed joint is shown in FIG. 2. The joint provides a sealed, jacketed enclosure for underlying insulation and steel pipe.

The foregoing disclosure and showings made in the drawings are merely illustrative of the principles of this invention and are not to be interpreted in a limiting sense.

I claim:

1. A method of joining together first and second thermoplastic jackets of insulated piping, comprising the steps of:
    a) providing a split thermoplastic sleeve that has first circumferential edge portion and a second circumferential edge portion, and also having first and second end portions that extend between the first and second circumferential edge portions with a welding rod arrangement extending along the first circumferential edge portion, the second end portion and the second circumferential edge portion, with the welding rod arrangement that is located along the first circumferential edge portion extending beyond the first end portion so as to form a first stub and with the welding rod arrangement that is located along the second circumferential edge portion extending beyond the first end portion so as to form a second stub, the welding rod arrangement comprising two side by side welding rods, with each of the welding rods comprising a solid core of thermoplastic material with a plurality of wires embedded in the core and located in close proximity to a surface of the core;
    b) wrapping the split sleeve around the first and second jackets such that the first circumferential edge portion is located around the first jacket and the second circumferential edge portion is located around the second jacket and the first and second end portions are overlapping, with the welding rod arrangement that extends along the first circumferential edge portion being interposed between the first circumferential edge portion and the first jacket and with the welding rod arrangement that extends along the second circumferential edge portion being interposed between the second circumferential edge portion and the second jacket and with the welding rod arrangement that extends along the second end portion being interposed between the first and second end portions, and with the first stub being adjacent to a portion of the welding rod arrangement that extends along the first circumferential edge portion and that is located near the second end portion, locating a nonconductive thermoplastic core between the first stub and the welding rod arrangement that extends along the first circumferential edge portion and that is located near the second end portion, the second stub being adjacent to a portion of the welding rod arrangement that extends along the second circumferential edge portion and that is located near the second end portion, locating another nonconductive thermoplastic core between the second stub and the welding rod arrangement that extends along the second circumferential edge portion and that is located near the second end portion;
    c) providing electrical current to the wires in the welding rods thereby heating the cores of the welding rods and welding the first circumferential edge portion to the first jacket, the second circumferential edge portion to the second jacket and the first end portion to the second end portion.

2. The method of claim 1 wherein the step of providing a split thermoplastic sleeve further comprises the step of coupling the welding rod arrangement to the split sleeve before wrapping the split sleeve around the first and second jackets.

3. The method of claim 2 wherein:
    a) the step locating a nonconductive thermoplastic core between the first stub and the welding rod arrangement that extends along the first circumferential edge portion further comprises the step of coupling the nonconductive thermoplastic core to the split sleeve before wrapping the split sleeve around the first and second jackets, with the nonconductive thermoplastic core being located between the first circumferential edge portion and the welding rod arrangement that extends along the first circumferential edge portion;
    b) the step of locating another nonconductive thermoplastic core between the second stub and the welding rod arrangement that extends along the second circumferential edge portion further comprises the step of coupling the other nonconductive thermoplastic core to the split sleeve before the wrapping the split sleeve around the first and second jackets, with the other nonconductive thermoplastic core being located between the second circumferential edge portion and the welding rod arrangement that extends along the second circumferential edge portion.

4. The method of claim 2 wherein the step of providing a split thermoplastic sleeve further comprises the step of offsetting that portion of the welding rod arrangement that extends along the first circumferential edge portion and that is located near the second end portion, with the offset of the welding rod arrangement that extends along the first circumferential edge portion being away from the first circumferential edge portion, and offsetting that portion of the welding rod arrangement that extends along the second circumferential edge portion and that is located near the second end portion, with the offset of the welding rod arrangement that extends along the second circumferential edge portion being away from the second circumferential edge portion wherein said offsets for locating said first and second stubs when said slit sleeve is wrapped around said first and second jackets.

5. The method of claim 1 further comprising the step of, before wrapping the split sleeve around the first and second jackets, abrading the first and second jackets and cleaning the first and second jackets.

6. The method of claim 1 further comprising the step of, after providing electrical current to the wires in the welding rods, pressure testing the welds of the sleeve to the first and second jackets.

7. The method of claim 1 further comprising, after providing electrical current to the wires in the welding rods, forming a hole in the sleeve so as to access a cavity inside of the split sleeve, and filling the cavity with foam through the hole.

8. The method of claim 7 further comprising the step of, after the filling the cavity with foam, welding a plastic patch over the hole so as to seal the cavity.

* * * * *